US009457846B2

(12) United States Patent
Levin

(10) Patent No.: US 9,457,846 B2
(45) Date of Patent: Oct. 4, 2016

(54) VEHICLE WITH A SUSPENDED DRIVER UNIT WITH LOCKING AND FORCE ABSORBING MEANS

(75) Inventor: Göran Levin, Hisings-Kärra (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 14/398,143

(22) PCT Filed: May 8, 2012

(86) PCT No.: PCT/SE2012/000068
§ 371 (c)(1),
(2), (4) Date: Oct. 31, 2014

(87) PCT Pub. No.: WO2013/169147
PCT Pub. Date: Nov. 14, 2013

(65) Prior Publication Data
US 2015/0130218 A1 May 14, 2015

(51) Int. Cl.
| | |
|---|---|
| *B62D 33/077* | (2006.01) |
| *B60N 2/427* | (2006.01) |
| *B60N 2/50* | (2006.01) |
| *B60N 2/54* | (2006.01) |
| *B60N 2/42* | (2006.01) |
| *B62D 33/06* | (2006.01) |

(52) U.S. Cl.
CPC ........... *B62D 33/077* (2013.01); *B60N 2/4221* (2013.01); *B60N 2/42736* (2013.01); *B60N 2/502* (2013.01); *B60N 2/544* (2013.01); *B62D 33/0604* (2013.01)

(58) Field of Classification Search
CPC ............ B62D 33/077; B62D 33/0604; B60N 2/4221; B60N 2/42736; B60N 2/502; B60N 2/544
USPC ..................................... 296/187.09
See application file for complete search history.

(56) References Cited

U.S. PATENT DOCUMENTS

| | | | |
|---|---|---|---|
| 3,917,339 A | 11/1975 | Fritz | |
| 7,416,243 B2 * | 8/2008 | Dammann | B62D 21/152 296/187.03 |

(Continued)

FOREIGN PATENT DOCUMENTS

| | | |
|---|---|---|
| DE | 1680095 | 10/1970 |
| DE | 2853621 A1 | 6/1979 |

(Continued)

OTHER PUBLICATIONS

International Search Report (Dec. 17, 2012) for corresponding International Application PCT/SE2012/000068.

*Primary Examiner* — Joseph D Pape
*Assistant Examiner* — Dana Ivey
(74) *Attorney, Agent, or Firm* — WRB-IP LLP

(57) ABSTRACT

A vehicle with a driver's cab including a driver unit with a vertically suspended floor structure and a vehicle steering control, a vehicle speed control and a driver's seat. The cab is provided with a deformation zone behind the driver unit for absorbing force in case of a frontal collision. A horizontal beam belonging to the cab frame structure is positioned in front of the driver unit. An arrangement for positively locking the beam to the driver unit is provided in case a frontal collision causes the beam to contact the driver unit.

7 Claims, 2 Drawing Sheets

(56) References Cited

U.S. PATENT DOCUMENTS 7,500,695 B2* 3/2009 Andersson ......... B60N 2/42736
280/748
8,353,556 B2* 1/2013 Moennich .......... B60N 2/42709
296/187.09

FOREIGN PATENT DOCUMENTS

DE 102008027175 A1 1/2009
DE 102010054410 A1 7/2011

* cited by examiner

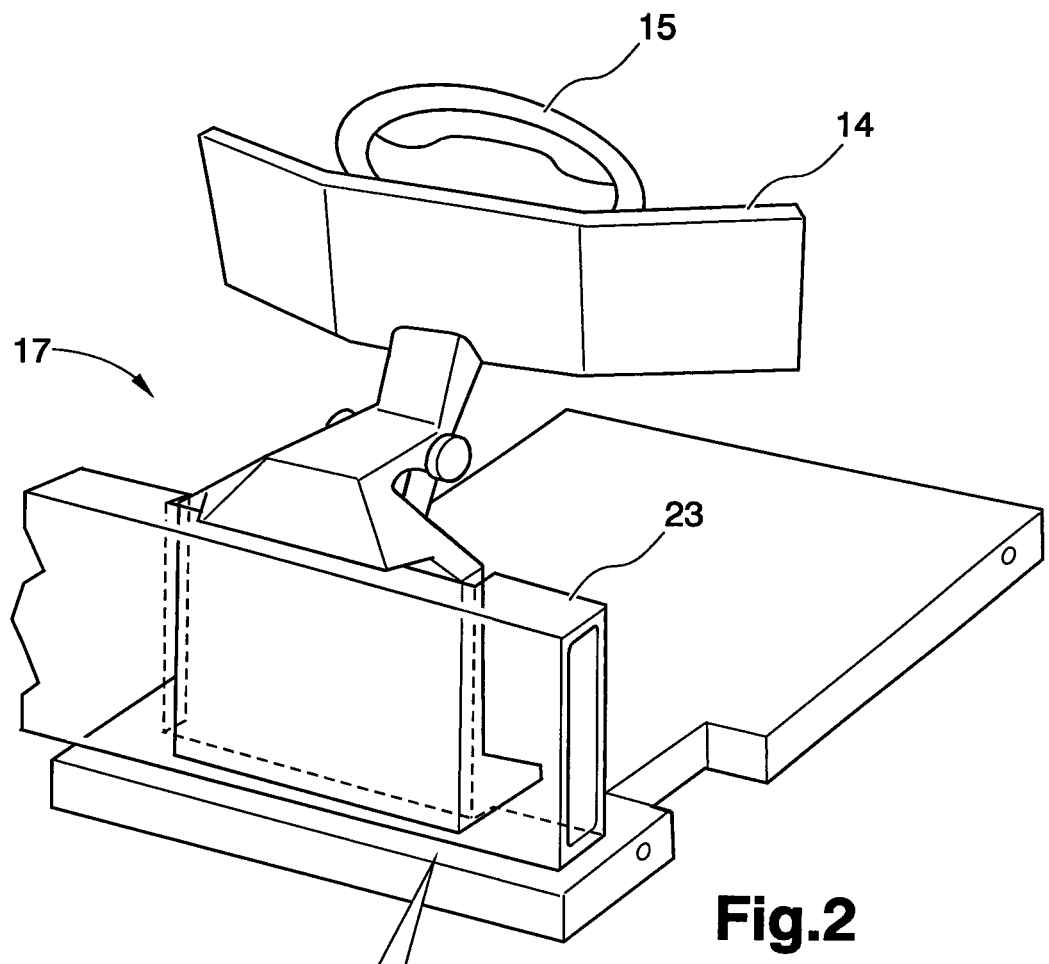
Fig.2
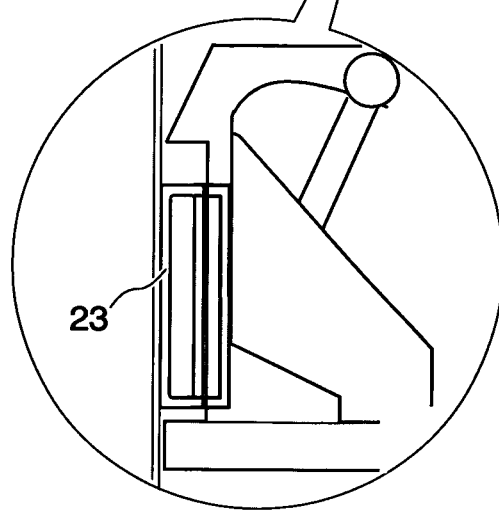

VEHICLE WITH A SUSPENDED DRIVER UNIT WITH LOCKING AND FORCE ABSORBING MEANS

BACKGROUND AND SUMMARY

The present invention relates to a vehicle with a drivers cab comprising a driver unit with a vertically suspended floor structure including; means for vehicle steering control, means for vehicle speed control and a driver's seat, wherein the cab is provided with a deformation zone behind the driver unit for absorbing force in case of a frontal collision.

The driver seating arrangement for heavy trucks and heavy construction vehicles usually comprises a seat with suspension for driver comfort. One disadvantage with seat suspension is that the seat moves up and down when driving over road surface deviations, in relation to the steering wheel, the pedals and other vehicle controls. The vertical movements can make it more difficult to control a heavy vehicle in a tight situation.

U.S. Pat. No. 3,774,711 discloses a driver's cab with a seat mounted as a driver unit on a platform that includes a steering wheel and foot pedals. The platform is mounted to the cab floor via a vertical suspension system. An advantage with this type of driver unit is that the seat can move vertically together with the steering wheel and the foot pedals when driving over road surface deviations. A disadvantage with this type of driver unit is that it is not well anchored to the cab structure with respect to its ability to protect the driver by absorbing crash forces.

DE 1680095 discloses a bus with a driver unit comprising a seat, a steering wheel and foot pedals. This driver unit is designed to protect the driver by moving horizontally backwards when subjected to a frontal crash force. However, this driver unit is not suspended for vertical motion.

It is desirable to provide a vehicle with a driver unit suspended for vertical motion, which also can protect the driver by providing controlled backward movement to absorb frontal crash forces.

According to an aspect of the present invention, a vehicle is provided with a driver's cab comprising a driver unit with a vertically suspended floor structure including means for vehicle steering control, means for vehicle speed control and a driver's seat, wherein the cab is provided with a deformation zone behind the driver unit for absorbing force in case of a frontal collision. According to an aspect of the invention, a horizontal beam belonging to the cab frame structure is positioned in front of the driver unit, and means are provided for positive locking the beam to the driver unit in case a frontal collision causes the beam to contact the driver unit. By locking the driver unit to the cab frame structure, it is possible to reduce vertical movements and to control the horizontal movement of the driver unit through the deformation zone.

The horizontal beam is preferably the lower member of a windscreen frame.

Preferably, the cab is provided with a double floor containing the suspension for the driver unit.

Advantageously, the double floor contains force absorbing means in said deformation zone for providing a controlled rearward movement of the driver unit in case of a frontal collision. Said force absorbing means may comprise two or more force absorbing crash tubes mounted in parallel extending between said driver unit and the cab frame structure.

According to an advantageous embodiment of the invention, the means for locking said beam to said driver unit comprises conical contact surfaces on the beam facing the driver unit and corresponding contact surfaces on said driver unit facing the beam, to control vertical movement in case of a frontal collision.

Preferably, guide rails positioned behind the driver unit are arranged to control the horizontal movement of the driver unit into the deformation zone as the force absorbing means are compressed.

According to another advantageous embodiment of the invention, the double floor is provided with lateral supports for the driver unit to guide the drive unit into the guide rails in case of a frontal collision.

Further embodiments of the invention are illustrated and explained in the figures.

BRIEF DESCRIPTION OF THE DRAWINGS

FIG. 2 is a perspective view illustrating the connection between the cab frame structure and the driver unit in case of a crash force on the cab frame structure.

DETAILED DESCRIPTION

Figure 1:
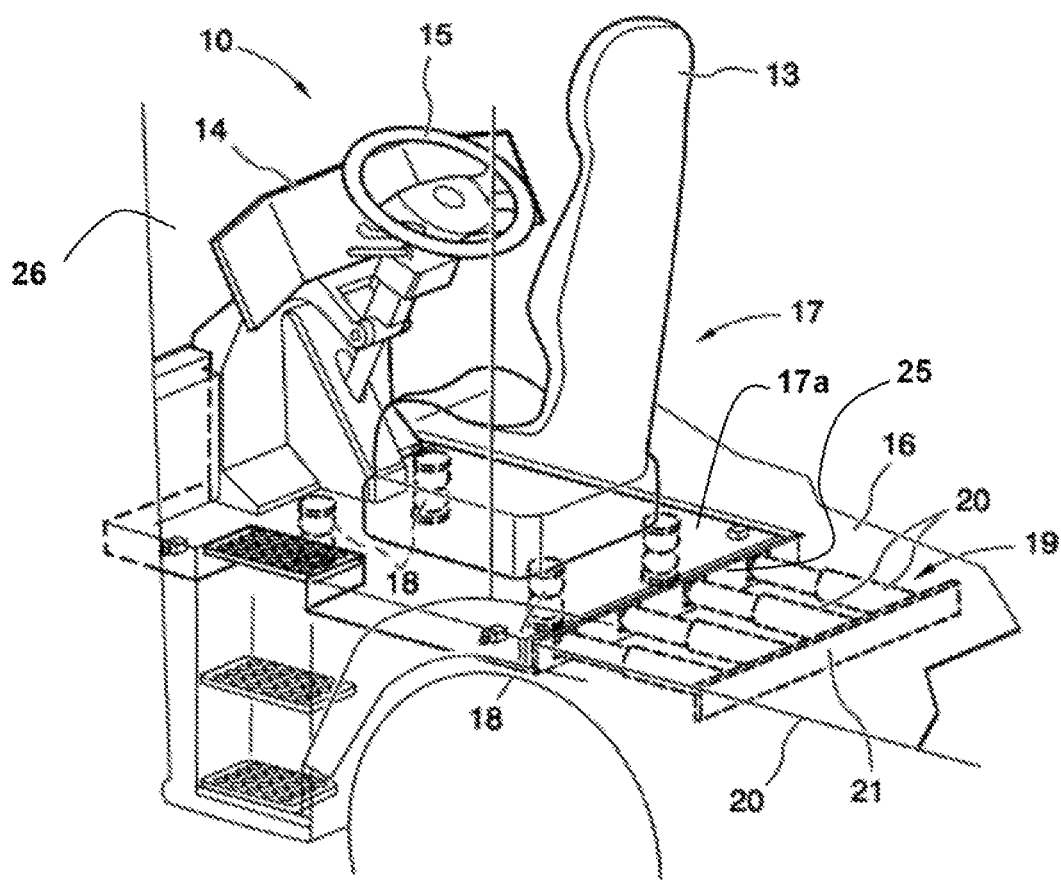
FIG. 1 shows the driver's cab of a commercial vehicle according to the invention in a schematic broken perspective view, with a vertically suspended driver unit.

FIG. 1 shows in a broken perspective view a commercial truck comprising a driver's cab 10 and a chassis 11. The driver's cab is provided with a side door, a driver's seat 13 and an instrument cluster 14 with a steering wheel 15. The cab 10 is suspended in a conventional manner in relation to the chassis 11 via not shown suspension means.

The lower part of the cab is provided with a double floor comprising a primary floor 16 and a secondary floor, together forming a cavity below the interior of the cab. This cavity can be used for housing equipment including electrical components, for example a vehicle control unit, and also a unit for controlling, the cab interior temperature and ventilation, for example an air conditioning unit.

The provision of a double floor cavity makes it possible to equip the cab with a vertically suspended driver unit 17 comprising a floor structure 17a including the driver's seat 13, the instrument cluster with steering wheel 15 and speed controls for the vehicle. The speed controls may comprise pedals for speed and braking and also a gear selector (not shown in the drawings). The floor structure 16 is mounted upon the secondary floor via four shock absorber units 18.

The cab can be provided with a locking mechanism for preventing the floor structure from moving vertically in relation to the cab when the vehicle is immobile. Mechanical springs may be used to preload the shock absorber units. A locking mechanism may be used for arresting the floor structure in a fixed position when the vehicle is parked, so that the top of the floor structure is level with the top of the primary floor.

As shown in FIG. 1, the cab is provided with a deformation zone 19 behind the driver unit 17 for absorbing force in case of a frontal collision. The double floor compartment contains force absorbing means in said deformation zone for providing a controlled rearward movement of the driver unit 17 in case of a frontal collision. In the shown embodiment, the force absorbing means comprise four force absorbing crash tubes 20 mounted in parallel, extending between said suspended floor structure 17a and the cab frame structure 21. In case of a crash, forces deforming the front of the vehicle will not destroy the driver unit 7. Instead crash forces transmitted to the driver unit from the front of the vehicle will push the entire driver unit 17 rearwards compressing the crash tubes 20. Longitudinal guide rails positioned behind the driver unit 17 are arranged to guide the driver unit to control the horizontal movement as the force absorbing means are compressed.

Normally there is a space in front of the driver unit 17 between said unit and a horizontal beam 23 belonging to the cab frame structure, to allow the driver unit to move vertically as permitted by the shock absorbers 18. FIG. 2 shows the driver unit 17 locked to the horizontal beam 23 a as a result of a frontal crash force which has deformed the cab frame enough to displace the horizontal beam into contact with the driver unit. Surfaces on both the front of the driver unit 17 and the rear of the beam 23 are designed to cooperate to guide the driver unit into a docking position, in which vertical movement of the driver unit is controlled within certain limits, and in which said unit can enter the longitudinal guide rails to begin compressing the crash tubes 20. Accordingly, in a crash situation, the beam 23 can move towards the driver unit and positive lock it vertically in position for crash force absorption via the crash tubes 20. The cooperating surfaces of the front of the driver unit 17 and the rear of the beam 23 for providing positive lock may be conical.

The horizontal beam can for example be the lower member of a windscreen frame for a windscreen 26. When the collision forces are offset, i.e. at an angle to the longitudinal axis of the vehicle, the horizontal beam 23 may hit the driver unit at a certain angle. To prevent the offset force from obstructing the driver unit 17 from entering the guide rails and activating the deformation zone, the double floor 16 can be provided with lateral supports 25 for the driver unit to guide the drive unit into the guide rails.

The invention has mainly been described above with reference to the disclosed embodiments. However, as is readily appreciated by the person skilled in the art, embodiments other than the ones disclosed above are equally possible within the scope of the invention, as defined by the appended claims. For example, the horizontal beam 23 may be some other part of the frame structure of the driver's cab than the lower member of the windscreen frame. Also, other means than crash tubes 20 may be used in the deformation zone for absorbing energy.

The invention claimed is:

1. A vehicle comprising
a cab comprising a driver unit with a vertically suspended floor structure including means for vehicle steering control, and a cab frame structure, wherein the cab is provided with a deformation zone behind the driver unit for absorbing force in case of a frontal collision,
a horizontal beam belonging to the cab frame structure being positioned in front of the driver unit, and means for positive locking of the beam to the driver unit,
wherein the cab is provided with a double floor containing a suspension for the suspended floor structure.

2. The vehicle as claimed in claim 1, the vehicle comprising a windscreen and a windscreen frame, wherein the horizontal beam is a lower member of the windscreen frame.

3. The vehicle as claimed in claim 1, wherein the double floor contains force absorbing means in the deformation zone.

4. The vehicle according to claim 3, wherein the force absorbing means comprises two or more force absorbing, crash tubes mounted in parallel extending between the driver unit, and the cab frame structure.

5. The vehicle as claimed in claim 1, wherein guide rails positioned behind the driver unit are arranged to control horizontal movement of the driver unit into the deformation zone as the force absorbing means are compressed.

6. The vehicle as claimed, in claim 5, wherein the double floor is provided with lateral supports for the driver unit.

7. A vehicle comprising
a cab comprising a driver unit with a vertically suspended floor structure including means for vehicle steering control, and a cab frame structure wherein the cab is provided with a deformation zone behind the driver unit for absorbing force in case of a frontal collision,
a horizontal beam belonging to the cab frame structure being positioned in front of the driver unit, and
means for positive locking of the beam to the driver unit in case a frontal collision causes the beam to contact the driver unit,
wherein the means for locking the beam to the driver unit comprises conical contact surfaces on the beam facing the driver unit and corresponding contact surfaces on the driver unit facing the beam.

* * * * *